US008200177B2

(12) United States Patent
Lee

(10) Patent No.: US 8,200,177 B2
(45) Date of Patent: Jun. 12, 2012

(54) NETWORK SEARCH METHOD OF USER EQUIPMENT FOR WIRELESS COMMUNICATION SYSTEM

(75) Inventor: John Phil Lee, Daegu Metropolitan (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 386 days.

(21) Appl. No.: 12/559,592

(22) Filed: Sep. 15, 2009

(65) Prior Publication Data

US 2010/0081433 A1   Apr. 1, 2010

(30) Foreign Application Priority Data

Sep. 30, 2008   (KR) .................. 10-2008-0095833

(51) Int. Cl.
*H04B 1/18* (2006.01)
(52) U.S. Cl. .................. 455/154.2; 455/422.1; 455/423; 455/145; 455/161.1
(58) Field of Classification Search ............... 455/422.1, 455/423, 425, 67.11, 145, 154.2, 161.1, 166.1
See application file for complete search history.

(56) References Cited

U.S. PATENT DOCUMENTS

| 5,355,517 | A | * | 10/1994 | Olson | 455/510 |
| 6,363,246 | B1 | * | 3/2002 | Williams et al. | 455/403 |
| 2008/0075035 | A1 | * | 3/2008 | Eichenberger | 370/328 |

FOREIGN PATENT DOCUMENTS

| KR | 2005-80332 | 8/2005 |
| KR | 2007-49716 | 5/2007 |
| KR | 2008-46347 | 5/2008 |
| WO | WO 2007/103991 | 9/2007 |

* cited by examiner

*Primary Examiner* — Tuan Pham
(74) *Attorney, Agent, or Firm* — Cha & Reiter, LLC

(57) ABSTRACT

A network search method of a user equipment (UE) for a wireless communication system that improves network search speed for acquiring Public Land Mobile Network (PLMN) available list available where the user equipment is located. A network search method measures powers of all the frequency bands supported by a UE in response to a network search request, generates a scan list as a result of measurement of the powers, searches networks listed in the scan list for available channels; acquires neighbor cell information from a system information message of one of the available channels. In addition, the method skips the networks indicated by the neighbor cell information in search of networks by removing the networks from the scan list.

8 Claims, 2 Drawing Sheets

NETWORK SEARCH METHOD OF USER EQUIPMENT FOR WIRELESS COMMUNICATION SYSTEM

CLAIM OF PRIORITY

This application claims priority to an application entitled "NETWORK SEARCH METHOD OF USER EQUIPMENT FOR WIRELESS COMMUNICATION SYSTEM" filed in the Korean Intellectual Property Office on Sep. 30, 2008 and assigned Serial No. 10-2008-0095833, the contents of which are incorporated herein by reference in its entirety.

BACKGROUND OF THE INVENTION

1. Field of the Invention

The present invention relates to a wireless communication system and, in particular, to a network search method of a User Equipment (UE) for a wireless communication system that is capable of improving network search performance for quickly acquiring the Public Land Mobile Network (PLMN) list available in which the UE is located.

2. Description of the Related Art

In a wireless communication system, a UE typically acquires the information about a Core Network through a system information message broadcast by the network and other information required for connecting to the network.

In case when a user requests manual network selection, the UE performs a network search procedure for providing a list of Public Land Mobile Networks (PLMNs), as described hereinbelow.

If the user selects the manual network selection mode, the UE performs a power scan on the adjacent PLMNs acquired from the system information received from the network and generates the result as a scan list.

Next, the UE searches from the scan list for the PLMNs supporting the frequency bands available for the UE to acquire the information regarding the available channels. The UE generates a PLMN list based on the available channel information, and indicates the user of the PLMN list. From this PLMN list, the user can select a PLMN. The UE then connects to the PLMN selected by the user and establishes data communication in response to a user request.

In the conventional manual network selection mechanism, the UE scans for all frequency bands in order to acquire the PLMN list of the adjacent PLMNs available where the UE is located. However, it takes a great deal of time to scan for all the frequency bands, and this action also increases power consumption of the UE. A partial scan search for specific frequency bands, i.e. a frequency scan in consideration of the location area, can be used to reduce the scanning time and power consumption. In this case, however, other frequency bands sharing the location area are excluded unintentionally. A conventional network selection procedure, in which the user selects a specific network manually from the list of supportable networks (i.e. a PLMN list) is described hereinafter with reference to FIG. 1.

FIG. 1 is a flowchart illustrating a convention manual network selection method for a wireless communication system. In FIG. 1, the UE selects a network through a conventional manual network selection procedure.

Referring to FIG. 1, the UE detects a manual network selection request input by the user (101). Once a manual network selection request is detected, the UE reads the information on the PLMNs available where the UE is located (103) and performs a power scan for the available PLMNs. Next, the UE searches all the channels listed on a scan list obtained as a result of the power scan for the supportable channels where the UE is located.

In consequence, the UE creates a PLMN list as a result of the channel search and displays the PLMN list on its display screen (105). If the user selects a PLMN from the PLMN list (107), then the UE connects to the selected PLMN through a camp-on process and establishes a communication in response of a user command.

In the conventional method as described above, the UE first creates a scan list containing all the channels supported by the UE and searches all the channels of the PLMNs found in the scan list. However, since the channel search is performed to all the channels listed in the scan list, it takes a long time to receive the responses from the corresponding networks. In case that multiple networks of the same operator exists where the UE is located, the channel search is likely to be performed repeatedly for the same channel, thereby increasing the channel search time, resulting in network search delay and thus service access delay.

There is another network search method in which the UE searches a specific frequency band for available channels. This partial scan search method performs network search to a specific frequency band in consideration of the location area such that the channel search time is reduced as compared to the previously described full scan search. However, the partial scan search has a drawback in that the other frequency bands sharing the location area are excluded unintentionally.

In short, the conventional full scan search method is disadvantageous in that it takes too long to search for the available networks, and the conventional partial scan search method is likely to lose the chance for identifying other available channels.

SUMMARY OF THE INVENTION

The present invention provides a network search method of a user equipment (UE) for a wireless communication system that can reduce PLMN list indication delay, especially in a manual network selection mode, by improving network search speed.

Also, the present invention provides a network search method of a user equipment (UE) for a wireless system that can facilitate service effectuation with quick PLMN list indication by improving network search speed.

Also, the present invention provides a network search method of a user equipment for a wireless communication system that can reduce network search delay by reducing a number of channels to be scanned dynamically based on the neighbor cell information contained in the system information message, especially in manual network or PLMN selection mode.

Also, the present invention provides a network search method of a user equipment (UE) for a wireless communication system that can reduce power consumption by minimizing the time for acquiring the PLMN list.

Also, the present invention provides a network search method of a user equipment for a wireless communication system that can reduce the time for recovering from a no-service state or a limited service state.

In accordance with an exemplary embodiment of the present invention, a network search method includes measuring powers of all frequency bands supported by a user equipment in response to a network search request; generating a scan list as a result of measurement of the powers; searching networks listed in the scan list for available channels; acquiring neighbor cell information from a system information message of one of the available channels; and skipping the networks indicated by the neighbor cell information in search of networks by removing the networks from the scan list.

In accordance with another exemplary embodiment of the present invention, a network search method for a user equipment includes performing power scan for Public Land Mobile Networks (PLMNs) supported by the user equipment in response to a network search event; generating a scan list based on a result of the power scan; searching for available channels with reference to the scan list; acquiring information on neighbor cells from a system information message of the available channels; removing PLMNs corresponding to the neighbor cells from the scan list with reference to the information on the neighbor cells; updating the scan list by reflecting the removal of the PLMNs corresponding to the neighbor cells; and indicating, when no more channels to be searched in the updated channel list, an available PLMN list of the user equipment with reference to the finally updated scan list.

BRIEF DESCRIPTION OF THE DRAWINGS

The above and other exemplary objects, features and advantages of the present invention will become more apparent from the following detailed description in conjunction with the accompanying drawings, in which.

DETAILED DESCRIPTION

Exemplary embodiments of the present invention are described with reference to the accompanying drawings in detail herein below. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

The network search method for a wireless communication system, as proposed by the present invention, is advantageous to improve the network search speed of a User Equipment (UE) especially in manual network selection mode. In an exemplary embodiment of the present invention, when a user requests a currently available network list, i.e. Public Land Mobile Network (PLMN) list, the improved network search method enables the UE to acquire the PLMN list quickly so as to facilitate access to the services.

In an exemplary embodiment of the present invention, the UE provides a manual network selection function. Using the manual network selection function, the user can manually select one of different operators' networks available where the UE is located. Accordingly, there is only need for the UE to identify the network available at the current location of UE rather than to check the list of all networks supporting the UE.

In an exemplary embodiment of the present invention, a network search method can quickly acquire and indicate the available PLMN list where the UE is located. That is, the network search method according to an exemplary embodiment of the present invention enables quickly searching for the networks available in which the UE is located, by reducing time wasted for scanning all frequency bands of the respective network operators. For this purpose, the network search method according to an exemplary embodiment of the present invention reduces a number of scanning routines by removing, when a specific operator's network is found in a sequential band scanning process, the frequency bands of the neighbor cells of the same operator from the scan list and indicates the existence of the operator's network, whereby the user quickly select a network.

In other words, the UE preferably removes the neighbor cell information of the same operator's network from the scan list obtained in the power scanning process so as to reduce a number of search processes, resulting in a reduction of network search time and power consumption. A network search method according to an exemplary embodiment of the present invention is now described hereinafter with reference to FIG. 2.

Figure 1:
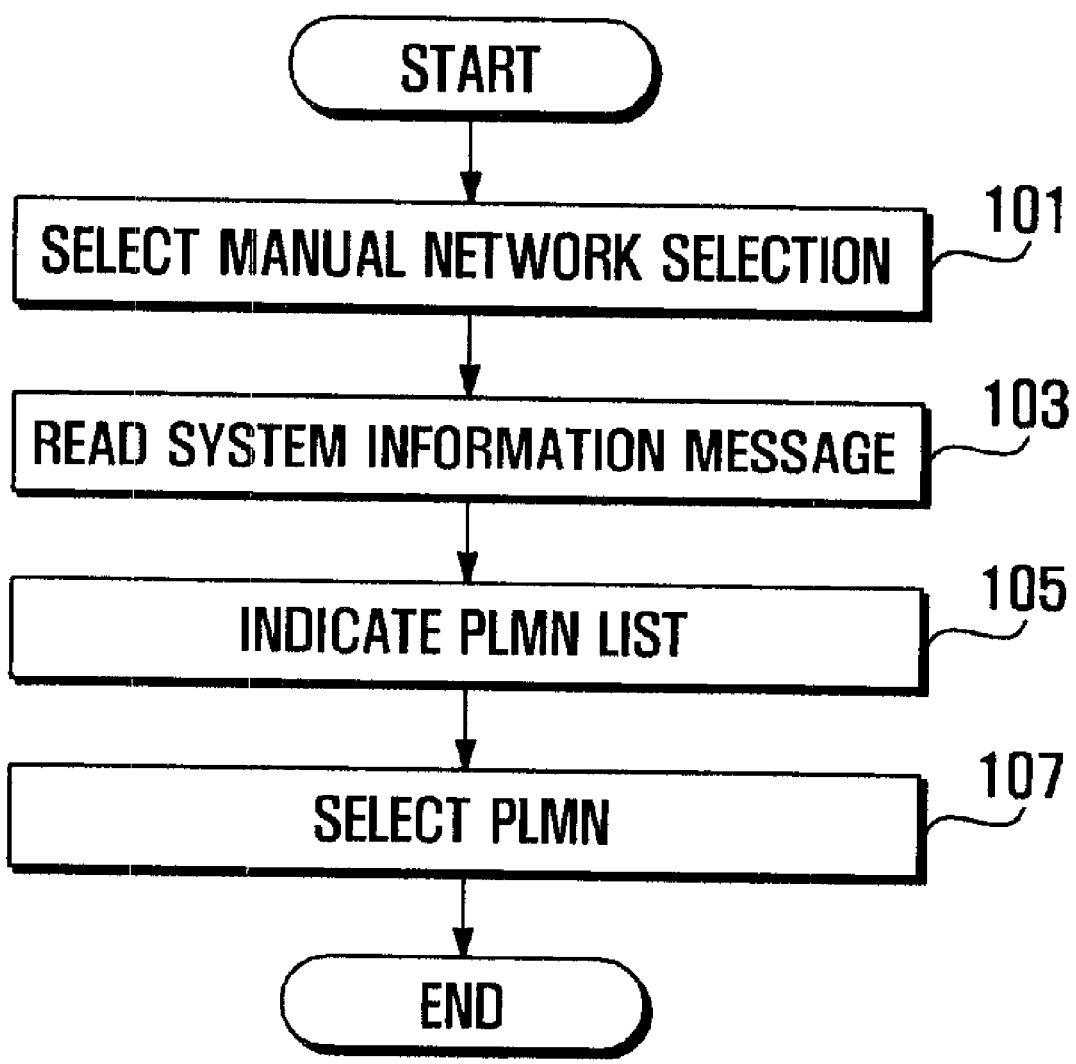
FIG. 1 is a flowchart illustrating a conventional manual network selection method for a wireless communication system.
Figure 2:
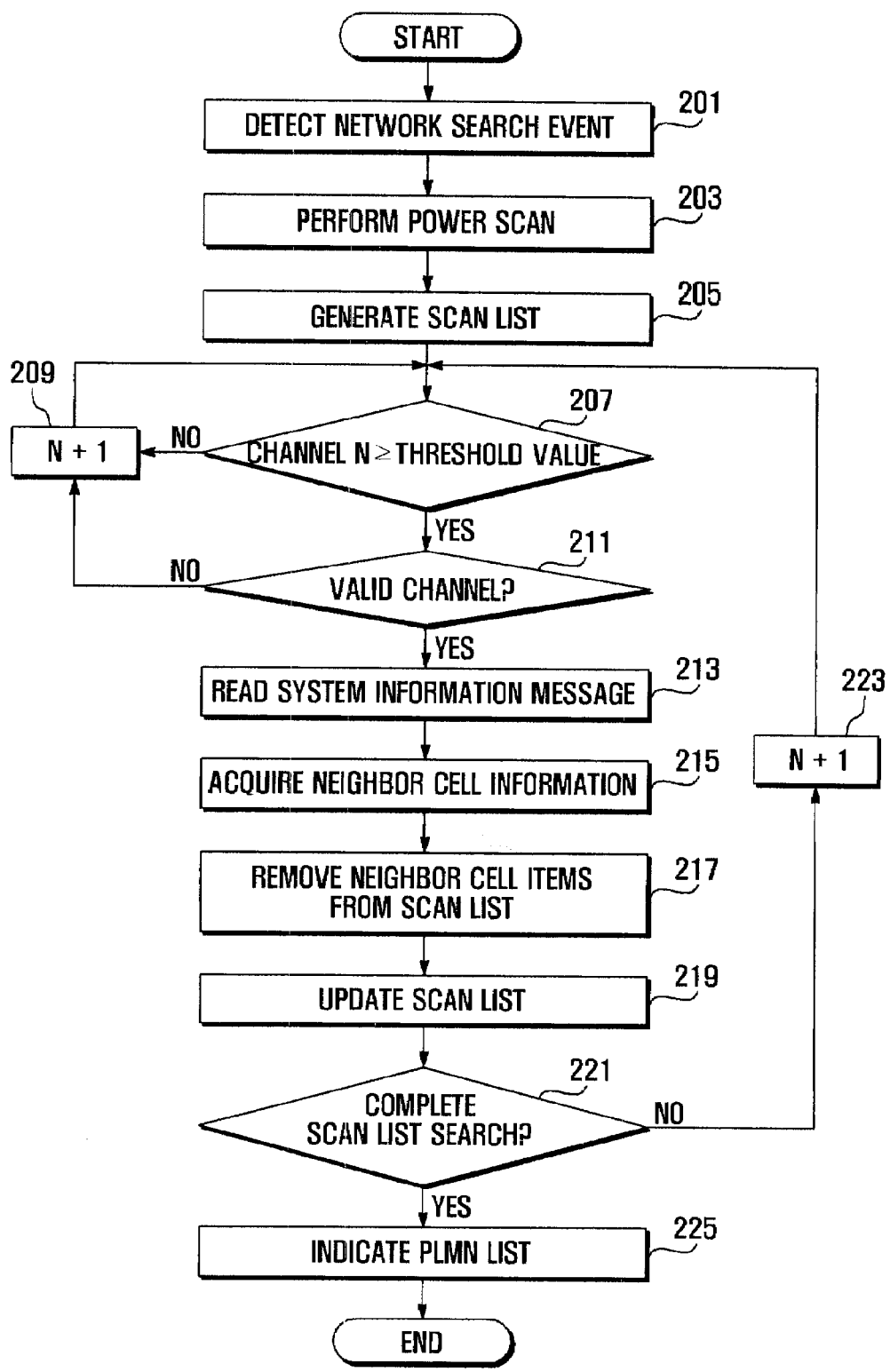
FIG. 2 is a flowchart illustrating a network search method for a wireless communication system according to an exemplary embodiment of the present invention.

FIG. 2 is a flowchart illustrating a network search method for a wireless communication system according to an exemplary embodiment of the present invention. More particularly, an exemplary manual network search procedure of a UE is provided in FIG. 2.

Referring now to FIG. 2, the UE first detects a network search event (201). Once a network search event is detected, the UE performs a power scan for all PLMNs existing around where the UE is located (203). Next, the UE generates a scan list as the result of the power scan (205). Here the network search event can be, for example, a manual network search request input by the user, the UE's transition from no-service state to normal service state, or another type of event triggering the network search.

After creating the scan list, the UE performs a search for available channels with reference to the scan list. In detail, the UE compares the power of a specific channel (e.g. channel N) listed in the scan list with a predetermined threshold value (207). The specific channel (channel N) can be, for example, a channel having a highest priority within the scan list. The UE compares the powers of the channels listed in the scan list with the threshold value in priority order. If the power of the channel N is less than the threshold value, the UE selects the next channel (e.g. channel N+1) (209) and compares the power of the next channel with the threshold value. Otherwise, if the power of the channel N is equal to or greater than the threshold value, then the UE determines whether the channel N is a valid channel (211). For instance, the UE can determine the validity of the channel N by comparing the synchronization with the network of channel N with reference to the synchronization information. The UE, for example, can acquire synchronization with the corresponding network using time information included in a message received through a synchronization, for example, a channel (Sync Channel, SCH) and searches for the paging channel of the network. The synchronization channel typically comprises a channel carrying various parameters information about the network. The parameters information includes protocol information, system identifier (ID), network ID, pilot channel PN offset number, long code state, system time and related information, paging channel speed, frequency channel number and the like. The UE acquires synchronization of its long code timing, system timing with the system time of the network with reference to the pilot channel offset, system time, long code PN sequence state information received through the synchronization channel.

If at step 211 it has been determined that the channel N is not valid, then the UE selects the next channel (e.g. N+1) from the scan list (209) and repeats step 207. Otherwise, if it has been determined that the channel is valid at step 209, the UE then reads the system information message of the valid channel (213) and acquires the information on the neighbor cells from the system information message (215).

Next, at step (217) the UE removes the PLMN corresponding to the neighbor cells from the scan list with reference to the information on the acquired neighbor cells. As a consequence, the UE updates the scan list by reflecting the removal of the neighbor cells (219).

Next, the UE determines whether there is another channel to be tested within the updated scan list, i.e. whether the channel validity test has completed (221). If there is another channel to be tested, the UE selects the next channel (e.g. N+1) from the updated scan list (223) and repeats step 207. Here, the next channel can be a channel of another network operator. Otherwise if there is no other channel to be tested at step 221, the UE displays an available PLMN list (225). Here, the supportable PLMN list can be the final scan list updated.

Once the available PLMN list is acquired, the UE attempts to camp on a PLMN selected, by the user, from the available PLMN list and perform data communication in response to a user request.

As described above in the exemplary embodiment of the network search method of the present invention, the number of channels to be searched are reduced when searching for the networks for acquiring available PLMN list where the UE is located. In other words, the channels of the neighbor cells that are informed by a system information message acquired during the channel search based on the scan list are removed from the scan list, thereby improving the network search performance.

In another exemplary embodiment of the present invention, the neighbor cells that are known during the channel availability test on the channels listed in the scan list acquired as a result of power scan are removed, it is possible to reduce the time to search for the available channels and thus quickly indicate the available PLMN list. The scan list is updated as the neighbor cells are removed. The scan list update procedure is described in more detail with an exemplary situation.

In still another exemplary embodiment of the present invention, the UE performs power measurements to all frequency bands which the UE supports when it searches for a PLMN list. That is, the UE performs power scan through step 203 of FIG. 2. The UE can generate a scan list as a result of the power scan. The scan list can be expressed in the form of a table as shown in the example in table 1.

TABLE 1

| Frequency Band | First Operator | Second Operator | Third Operator |
|---|---|---|---|
| 1 | ✓ | | |
| 2 | | ✓ | |
| 3 | | | ✓ |
| 4 | ✓ | | |
| 5 | | ✓ | |
| 6 | | | ✓ |
| 7 | | | ✓ |
| 8 | ✓ | | |
| 9 | | ✓ | |
| 10 | ✓ | | |
| 11 | | | ✓ |

Table 1 shows an exemplary scan list in which 11 frequency bands, from band 1 to band 11, are included and supported by different network operators. The frequency bands can be sorted by network operator as shown in tables 2 to 4. Each frequency band can be designated for m frequency channels (m is a natural number).

TABLE 2

| Frequency Band | Neighbor Cell |
|---|---|
| 1 | Neighbor Cell (4, 8, 10) |
| 4 | Neighbor Cell (1, 8, 10) |
| 8 | Neighbor Cell (1, 4, 10) |
| 10 | Neighbor Cell (1, 4, 8) |

TABLE 3

| Frequency Band | Neighbor Cell |
|---|---|
| 2 | Neighbor Cell (5, 9) |
| 5 | Neighbor Cell (2, 9) |
| 9 | Neighbor Cell (2, 5) |

TABLE 4

| Frequency Band | Neighbor Cell |
|---|---|
| 3 | Neighbor Cell (6, 7, 11) |
| 6 | Neighbor Cell (3, 7, 11) |
| 7 | Neighbor Cell (3, 6, 11) |
| 11 | Neighbor Cell (3, 6, 7) |

Table 2 shows an example of an operator-specific scan list of the first operator which is composed of the information on the frequency bands assigned to the first operator and neighbor cells (frequency bands) of each frequency band that is separated from table 1, table 3 shows an operator-specific scan list of the second operator which is composed of the information on the frequency bands assigned to the second operator and neighbor cells of each frequency band that is separated from table 1, and table 4 is shows an operator-specific scan list of the third operator which is composed of the information on the frequency bands assigned to the second operator and neighbor cells of each frequency band that is separated from table 1.

After creating the scan list, the UE searches for available channels by comparing the power of each channel listed in the scan list with a threshold value and testing validity of the channel of which power is greater than the threshold value through steps 207 to 211. The available channel search is performed from the bane 1 to band 11 listed in the scan list as shown in table 1 in priority order until a channel satisfying the conditions is found. Assuming that the channel N is found as an available channel and corresponds to the frequency band 1 assigned to the first operator, the UE reads the system information message of a valid channel of the band 1 and acquires neighbor cell information from the system information message.

As shown in tables 1 and 2, the neighbor cells of the cell corresponding to the frequency band 1 are of the frequency band 4, frequency band 8, and frequency band 10. Accordingly, the UE removes the frequency bands 4, 8, 10 corresponding to the neighbor cells of the cell assigned the frequency band 1 and updates the scan list by reflecting the removal of the neighbor cells' frequency bands. In this case, the scan list is updated as shown in table 5.

TABLE 5

| Frequency Band | First Operator | Second Operator | Third Operator |
|---|---|---|---|
| 1 | ✓ | | |
| 2 | | ✓ | |

TABLE 5-continued

| Frequency Band | First Operator | Second Operator | Third Operator |
|---|---|---|---|
| 3 | | | ✓ |
| 5 | | ✓ | |
| 6 | | | ✓ |
| 7 | | | ✓ |
| 9 | | ✓ | |
| 11 | | | ✓ |

In case that the frequency band 1 assigned to the first operator is found as the available frequency band, the UE excludes the other frequency bands (band 4, band 8, and band 10) of the first operator, indicated by the information on neighbor cells adjacent to the cell of frequency band 1, from the scan list for network search. Accordingly, the UE skips testing the availability of the frequency bands 1, 8, and 10, whereby the network search time for acquiring the PLMN list of available bands where the UE is located is reduced.

After the channel search to the first operator has completed, the UE performs the channel search process for the next network operator. That is, after finding the frequency band 1 assigned to the first operator, the UE performs channel search to the frequency band 2. Assuming that the channel N+1 is found as an available channel and corresponds to the frequency band 2 assigned to the second operator, the UE reads the system information message of the valid channel of the frequency band 2 and acquires neighbor cell information from the read system information message.

As shown in the exemplary tables 1 and 3, the neighbor cells of the cell corresponding to the frequency band 2 are of the frequency band 5 and frequency band 9. Accordingly, the UE removes the frequency bands 5 and 9 corresponding to the neighbor cells of the cell assigned the frequency band 2 and updates the scan list by reflecting the removal of the neighbor cells' frequency bands. In this case, the scan list is updated as shown in table 6.

TABLE 6

| Frequency Band | First Operator | Second Operator | Third Operator |
|---|---|---|---|
| 1 | ✓ | | |
| 2 | | ✓ | |
| 3 | | | ✓ |
| 6 | | | ✓ |
| 7 | | | ✓ |
| 11 | | | ✓ |

In case that the frequency band 2 assigned to the second operator is found to be the available frequency band, the UE excludes the other frequency bands (frequency bands 5 and 9) of the second operator, indicated by the information on the neighbor cells adjacent to the cell of frequency band 2, from the scan list for network search. Accordingly, the UE skips testing the availability of the frequency bands 5 and 9, whereby network search time for acquiring the available PLMN list where the UE is located is reduced.

After the channel search to the second operator has completed, the UE performs the channel search process for the next network operator. That is, after finding the frequency band 2 assigned to the second operator, the UE performs channel search to the frequency band 3. Assuming the channel N+2 is found as an available channel and corresponds to the frequency band 3 assigned to the third operator, the UE reads the system information message of the valid channel of the frequency band 3 and acquires neighbor cell information from the read system information message.

As shown in the exemplary tables 1 and 4, the neighbor cells of the cell corresponding to the frequency band 3 are of the frequency band 6, frequency band 7, and frequency band 11. Accordingly, the UE removes the frequency bands 6, 7, and 11 corresponding to the neighbor cells of the cell assigned the frequency band 3 and updates the scan list by reflecting the removal of the neighbor cells' frequency bands. In this case, the scan list is updated as shown in table 7.

TABLE 7

| Frequency Band | First Operator | Second Operator | Third Operator |
|---|---|---|---|
| 1 | ✓ | | |
| 2 | | ✓ | |
| 3 | | | ✓ |

In case that the frequency band 3 assigned to the third operator is found to be the available frequency band, the UE excludes the other frequency bands (frequency bands 6, 7, and 11) of the third operator, indicated by the information on the neighbor cells adjacent to the cell of frequency band 3, from the scan list for network search. Accordingly, the UE skips testing the availability of the frequency bands 6, 7, and 11, whereby network search time for acquiring the PLMN list available where the UE is located is reduced.

Compared with the example of the present invention, whereas in the case of performing a network search to frequency bands 1 to 11 listed in the scan list of table 1 using the conventional network search method, the UE in the conventional network search performs 11 times the amount of network searches than in the presently claimed invention according to the aforementioned examples.

In addition, the network search method according to an exemplary embodiment of the present invention enables the UE to complete the network search process on with 3 frequency bands listed in the update scan list of table 7. Furthermore, assuming that each of the frequency bands listed in table 1 includes m channels (m is a natural value), the conventional network search method must perform the available channel search to 11×m channels. However, even when assuming that each of the frequency bands listed in table 7 includes 3 channels (m is a natural value), the network search method according to an exemplary embodiment of the present invention performs the available channel search to 3×m channels, a much lower number of searches being performed.

That is, the network search method according to an exemplary embodiment of the present invention allows the UE to skip searching for the channels of the frequency bands of the neighbor cells indicated by the system information received through an available channel of the current cell, thereby decreasing the number of channels to be searched and thus reducing the time required for acquiring the available PLMN list whether the UE is located.

In an exemplary embodiment of the present invention, the neighbor cell information can be acquired from a broadcast message transmitted by the network. The broadcast message can be the system information message periodically transmitted by the network. In a wireless communication system, the system information message is broadcast for providing the UEs within the cell with the information commonly required for the user to connect the cell. The system message includes but is in now way limited to: a Scheduling Block for scheduling cells, a Master Information Block (MIB) for specifying the system information blocks used in a cell, and various System Information Blocks. The system information message is broadcast periodically.

The UE can receive the system information message through a specific channel (e.g. Broadcast Control Channel, BCCH), the system information message being transmitted by a network (e.g. PLMN) controlling the cell in which the UE is located. The UE can acquire the information required for the UE to connect to the corresponding network as well as the information on the Core Network (CN) by means of the system information message.

In one exemplary embodiment of the present invention, the scan list includes, for example, the Channel Number of a Serving cell, a Base Station ID (BSID), a Mobile Country Code (MCC), a Mobile Network Code (MNC), and Broadcast channel Allocation (BCCH) list of the system information. The Channel Number can be indicated by an Absolute Radio Frequency Channel Number (ARFCN) in a PLMN. The ARFCN is a channel number for identifying radio frequency channel designated by the PLMN and used for identifying the cells in the PLMN.

In another exemplary embodiment of the present invention, the network can be any of $2^{nd}$ Generation (2G) network such radio access networks of Global System for Mobile communications (GSM), 2.5G GSM and Code Division Multiple Access (CDMA) networks, 3G Universal Mobile Telephone System (UMTS), Wideband Code Division Multiple Access (WCDMA), and their equivalent networks and combination of these networks. Since these kinds of networks are obvious to those skilled in the art, detailed descriptions are omitted.

In still another exemplary embodiment of the present invention, the UE can be a communication device operating with one or more of communication protocols developed for International Mobile Telecommunication 2000 (IMT-2000), Time Division Multiple Access (TDMA), GSM, CDMA, UMTS, and WCDMA, just to name a few possible examples; and information processing devices and multimedia device such as Portable Multimedia Player (PMP), MP3 player, digital broadcast receiver, Personal Digital Assistant (PDA), Smartphone, cellular phone, and their equivalent devices, also just to name a few devices.

As described above, the network search method for a wireless communication system according to the present invention reduce the network search time for acquiring a PLMN available list where the UE is located. Also, the network search method of the present invention checks the channels of neighbor cells with reference to the neighbor cell information contained a system information message and removes the channels of the neighbor cells from a scan list, thereby reducing the network search time. By reducing the network search time, the network search method of the present invention can reduce the PLMN list indication delay and power consumption of the UE.

Also, the network search method of the present invention reduces a number of channels to be searched in the network search process for acquiring a PLMN list, thereby reducing the network search time and PLMN list acquisition delay. The network search method of the present invention reduces the network search time such that, when the user requests a manual network selection to acquire the PLMN list available where the UE is located, the UE can acquire and indicate the PLMN available list very quickly.

Although exemplary embodiments of the present invention have been described in detail hereinabove, it should be clearly understood that many variations and/or modifications of the basic inventive concepts herein taught which may appear to those skilled in the present art will still fall within the spirit of the present invention and scope of the appended claims.

What is claimed is:

1. A network search method for a user equipment (UE), comprising:
   (a) performing a power scan for Public Land Mobile Networks (PLMNs) supported by the UE in response to a network search event;
   (b) generating a scan list based on a result of the power scan in (a);
   (c) searching for available channels with reference to the scan list generated in (b);
   (d) acquiring information on neighbor cells from a system information message of the available channels;
   (e) updating the scan list with reference to the acquired information on the neighbor cells; and
   (f) indicating, when no more channels to be searched in the updated scan list, an available PLMN list of the UE with reference to the finally updated scan list.

2. The network search method of claim 1, wherein the network search event comprises at least one of:
   a manual network selection request input by a user and a state transmission of the user equipment from a no-service state to a normal service state.

3. The network search method of claim 1, wherein searching for available channels in step (c) comprises:
   (i) comparing a measured power of a specific channel listed in the scan list with a predetermined threshold value; and
   (ii) testing, when the measured power of the specific channel is equal to or greater than the predetermined threshold value, a validity of the specific channel.

4. The network search method of claim 3, wherein the specific channel comprises a channel having a highest priority among the channels corresponding to frequency bands sorted in a priority order within the scan list.

5. The network search method of claim 1, wherein the available PLMN list comprises the finally updated scan list.

6. The network search method of claim 1, further comprising camping on a PLMN selected by the user from the available PLMN list.

7. The network search method of claim 1, further comprising repeating, when another channel to be searched exists in the updated scan list, available channel search.

8. The network search method of claim 1, wherein updating the scan list in step (e) comprises:
   removing PLMNs corresponding to the neighbor cells from the scan list with reference to the acquired information on the neighbor cells.

* * * * *